US008365270B2

(12) United States Patent
Webb-Johnson

(10) Patent No.: US 8,365,270 B2
(45) Date of Patent: Jan. 29, 2013

(54) PROXY SERVER

(75) Inventor: Mark Crispin Webb-Johnson, Kowloon (CN)

(73) Assignee: Network Box Corporation Limited, Kowloon (HK)

( * ) Notice: Subject to any disclaimer, the term of this patent is extended or adjusted under 35 U.S.C. 154(b) by 688 days.

(21) Appl. No.: 12/341,837

(22) Filed: Dec. 22, 2008

(65) Prior Publication Data

US 2009/0249467 A1  Oct. 1, 2009

Related U.S. Application Data

(63) Continuation-in-part of application No. PCT/IB2007/001785, filed on Jun. 29, 2007.

(30) Foreign Application Priority Data

Jun. 30, 2006 (AU) ................................ 2006903548

(51) Int. Cl.
*G06F 9/00* (2006.01)

(52) U.S. Cl. ................ 726/12; 726/11; 726/13; 705/79; 713/153; 713/154; 709/238; 370/351

(58) Field of Classification Search ...................... 726/12, 726/11, 13; 705/79; 713/153, 154
See application file for complete search history.

(56) References Cited

U.S. PATENT DOCUMENTS

| 5,727,159 | A | | 3/1998 | Kikinis |
| 5,918,013 | A | * | 6/1999 | Mighdoll et al. ............. 709/217 |
| 5,983,348 | A | * | 11/1999 | Ji ..................................... 726/13 |
| 6,009,462 | A | * | 12/1999 | Birrell et al. .................. 709/206 |
| 6,654,787 | B1 | * | 11/2003 | Aronson et al. ............. 709/206 |
| 7,240,095 | B1 | * | 7/2007 | Lewis ............................ 709/206 |
| 7,475,146 | B2 | * | 1/2009 | Bazot et al. .................... 709/227 |
| 7,606,762 | B1 | * | 10/2009 | Heit ................................. 705/39 |
| 7,836,132 | B2 | * | 11/2010 | Qureshi et al. ................ 709/206 |
| 2001/0037292 | A1 | * | 11/2001 | Vogt ................................ 705/39 |
| 2002/0174348 | A1 | * | 11/2002 | Ting ............................. 713/186 |
| 2003/0140112 | A1 | * | 7/2003 | Ramachandran et al. ..... 709/217 |
| 2004/0044740 | A1 | | 3/2004 | Cudd et al. |
| 2004/0117450 | A1 | * | 6/2004 | Campbell et al. ............. 709/207 |
| 2004/0117785 | A1 | * | 6/2004 | Kincaid ........................ 717/170 |
| 2004/0216173 | A1 | * | 10/2004 | Horoszowski et al. ........ 725/145 |
| 2004/0268145 | A1 | * | 12/2004 | Watkins et al. ............... 713/201 |
| 2005/0138196 | A1 | * | 6/2005 | Pfeffer et al. ................. 709/231 |
| 2005/0216564 | A1 | * | 9/2005 | Myers et al. .................. 709/206 |
| 2005/0240773 | A1 | * | 10/2005 | Hilbert et al. ................. 713/182 |
| 2006/0160622 | A1 | * | 7/2006 | Lee et al. ......................... 463/42 |
| 2006/0192990 | A1 | * | 8/2006 | Tonegawa ..................... 358/1.15 |
| 2006/0235723 | A1 | * | 10/2006 | Millard ............................. 705/1 |
| 2007/0127515 | A1 | * | 6/2007 | Ben-Arie et al. .............. 370/429 |
| 2007/0174471 | A1 | * | 7/2007 | Van Rossum ................ 709/229 |
| 2008/0235106 | A1 | * | 9/2008 | Reisman ......................... 705/26 |

* cited by examiner

FOREIGN PATENT DOCUMENTS

| CN | 1645392 A | 7/2005 |
| JP | 2004362062 A | 12/2004 |

OTHER PUBLICATIONS

Myers et al., "Post Office Protocol Version 3 (POP3)," IETF—RFC 1939, May 1996.

*Primary Examiner* — April Shan
(74) *Attorney, Agent, or Firm* — Robert Iannucci; Seed IP Law Group PLLC

(57) ABSTRACT

A proxy server for downloading a data file for a client, such as an email client or web browser, including: a external proxy for downloading the data file for the client from an external server over a network, based on profile data associated with the client stored on the proxy server; a memory module for storing the data file; and an internal proxy for transferring the data file to the client when requested by the client. The external proxy operates asynchronously to the internal proxy, and the proxy server operates transparently with respect to the client.

38 Claims, 11 Drawing Sheets

PROXY SERVER

BACKGROUND

1. Technical Field

The present disclosure relates to a proxy server for downloading one or more data files from an external server.

2. Description of the Related Art

In a networked computing environment, a user may have a computer which connects via a local network (e.g. a LAN or WAN) and a local network server to the Internet. In some environments, the local network server may provide only a connection to the Internet without other services such as email or firewalls. For example, when a user first establishes a local network and wishes to connect to the Internet, only the most basic connection will be required. The user may then access an external server, via the Internet, and send and retrieve files, including email files (e.g. using the POP3 protocol), or Web documents (e.g. using RSS feeds). The user may also wish to access the external server via an alternate Internet connection; for example, the local network server may provide Internet access in the user's workplace, while an Internet Service Provider (ISP) may provide Internet access in the user's home.

One problem associated with the above-described situation is that, when the local server (e.g. in the workplace) has a slow Internet connection, it may take a long time for a user to access files on the external server. A second problem is that the local server (e.g. in the workplace) may cause further time delays when filtering incoming data for 'malware': e.g. SPAM, computer viruses, Trojan horses and worms.

The email protocol 'POP3' is an example of a protocol used by a client to access content data on the external server for instant or subsequent use by the user, when the content data has been delivered to the server asynchronously from the user's access to the server. This type of asynchronous content delivery is different from other transport protocols. POP3 is not used for email transport from server to server; POP3 is used after the mail transport system has delivered a message to a user's mailbox (on the external server), asynchronously from the client's access to the mailbox. POP3 is used by a user's mail client, or 'Mail User Agent' (MUA). Examples of such clients to retrieve email from a server-resident mailbox include Outlook by Microsoft Corporation and Mail by Apple Computer, Inc.

Although users may access their mailboxes using POP3 in a LAN at their workplace, they may also do so outside that environment. Users who use POP3 both via a local network and via an alternate Internet provider may include sales staff on the road, executives accessing corporate mailboxes from home, and staff in a small company using email mailboxes on an external server. The access delay problems apply to both situations.

It is desired to address the above, or at least provide a useful alternative.

BRIEF SUMMARY

In accordance with one embodiment, there is provided a proxy server for downloading a data file for a client, including:

a download module for downloading the data file for the client from an external server over a network, based on profile data associated with said client and stored on the proxy server;

a memory module for storing said profile data and said data file; and a transfer module for transferring the data file to said client when requested by said client.

One embodiment provides a proxy process, including:

storing profile data associated with a client;

downloading a data file for the client from an external server over a network, using the stored profile data;

storing said data file; and transferring the data file to said client when requested by said client One embodiment is computer-readable medium including contents that cause a computing device to implement a process comprising:

storing profile data associated with a client;

downloading a data file for the client from an external server over a network, using the stored profile data;

storing said data file; and transferring the data file to said client when requested by said client.

In one embodiment, the process includes obtaining the profile data from the client, and validating the profile data by communication with the external server.

In one embodiment, the profile data includes an Internet protocol address and authentication data associated with said client.

In one embodiment, said client comprises an MUA and the profile data is obtained using the Post Office Protocol (POP).

In one embodiment, the process includes communicating with the external server and with the client using the Post Office Protocol (POP).

In one embodiment, the process includes storing said data file in an intermediate data store and storing said client profile data in an authentication data store.

In one embodiment, the process includes validating authentication data using Post Office Protocol (POP) commands in the Authorization State and storing the validated data in the authentication data store.

In one embodiment, the process includes obtaining data files from the external server uses POP commands and storing said data files in the intermediate data store, and marking data files in said intermediate data store for deletion using POP commands in the Update State.

BRIEF DESCRIPTION OF THE SEVERAL VIEWS OF THE DRAWINGS

Preferred embodiments are hereinafter described, by way of example only, with reference to the accompanying drawings in which.

DETAILED DESCRIPTION

Figure 1:
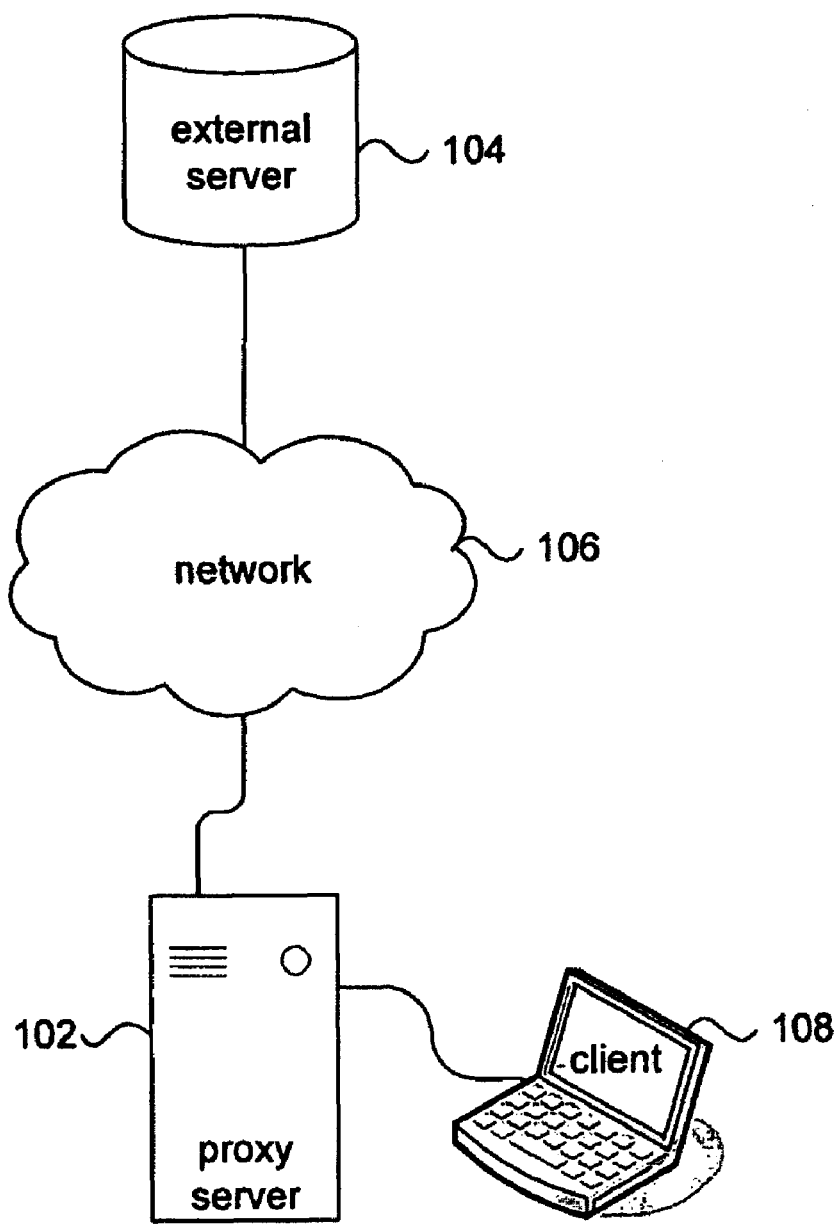
FIG. 1 is an arrangement of components, including a proxy server configured according to a preferred embodiment of the present invention.

A proxy server 102, as shown in FIG. 1, downloads data files from an external server 104 via a communications network 106, such as the Internet. The proxy server 102 stores the data files then transfers them to a client 108 when requested. The data files are content files, such as emails, MP3s, etc, that are delivered to the server asynchronously from the user's access to the server. The following describes the proxy server 102 with reference to accelerating the Post Office Protocol (POP) version 3 (POP3), but it can also be used for other protocols that involve similar asynchronous delivery of content, such as RSS feed documents specified in an XML format and obtained using an aggregator or feed reader, such as that incorporated into the web browsers Firefox and Safari. For the purposes of this description, example data files include email messages, downloaded using the POP3 protocol; an example network 106 is the Internet; and an example client 108 is a Mail User Agent (MUA) running on a standard personal computer device, such as a PC, PDA or Apple Macbook. The POP3 protocol is discussed in RFC 1939 (http://www.ietf.org/rfc/rfc1939.txt) and is outlined in the accompanying Appendix.

The proxy server 102, in the form of a local server on a LAN or WAN is able to download desirable files from the external server 104 via the network 106 and store them, ready for transfer to a client 108 (e.g. a Mail User Agent, MUA) when requested. This is a process of 'pre-downloading', which advantageously allows for files to be downloaded from the external server 104 over a slow Internet connection and stored on the local proxy server 102 before the client 108 requests the files. The stored files may also be 'pre-scanned': i.e. scanned for unwanted content, e.g. computer viruses, while residing on the proxy server 102 and before the files are requested by the client. Finally, the files may be transferred rapidly over the local network when requested by the client 108. In one example application, the proxy server 102 retrieves email from an electronic mailbox on an external server 104 during the night, using the POP3 protocol, scans the email for viruses/SPAM/etc, and then transmits them to a user's MUA when next requested by the MUA.

Figure 2:
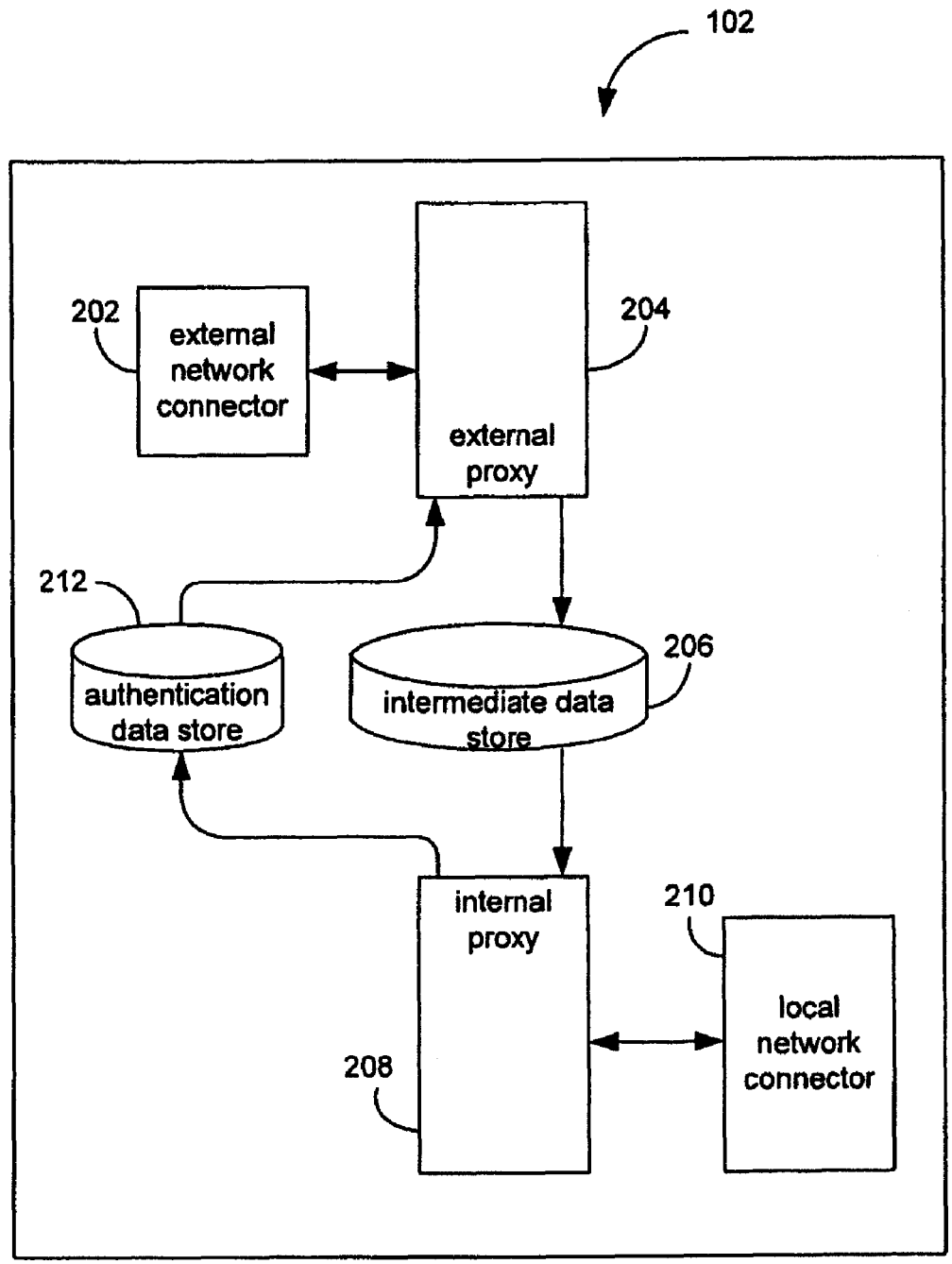
FIG. 2 is a schematic diagram of the proxy server in FIG. 1.

The proxy server 102, as shown in FIG. 2, includes:

(a) a download module in the form of an external network connector 202 and an external proxy 202;

(b) a memory module in the form of an intermediate data store 206 and an authentication data store 212; and (c) a transfer module for transferring to a client in the form of an internal proxy 208 and a local network connector 210.

The proxy server 102 can be implemented using a number of different hardware and/or software components. The server 102 may include a standard computer server, such as produced by IBM Corporation or Apple, Inc., with network cards to provide the network connectors 202 and 210, and computer program code, written in a language such as C++ or Perl that runs on an operating system (such as Unix, Linux or Mac OS X), to define and provide the external proxy 202 and the internal proxy 208. A database server (such as MySQL) can be used to maintain and provide the data stores 206 and 212. Alternatively, the components may be separated, for example by providing separate data stores 206 and 212, and the external proxy 202 and the internal proxy 206 may be provided by separate hardware machines. Also, dedicated hardware circuits, such as ASICs or FPGAs, can be employed to replace at least part of the computer code and perform the same processes as the code at faster processing speeds.

The proxy server 102 is advantageously a transparent proxy, i.e. the external proxy 204 acts as a client to the external server 104, and the internal proxy 208 acts as a server for the client 108. The external server 104 and the client 108 communicate with the proxy server 102 in a similar manner (e.g. using the same protocols and identification data) as if the proxy server 102 were not there (i.e. as if the client 108 were communicating directly with the external server 104 via the network 106).

The authentication data store 212 stores profile data for the client 108. The profile data includes a username, password and an address of the external server 104 on the network 106. For example, the authentication data store 212 may store the Internet address of an external server 104 in the form of an email server connected to the Internet, plus the username and password to allow email messages to be downloaded from the email server by the external proxy 204; in this way, the external proxy 204 is able to act as a mail client from the perspective of external server 104.

Figure 3:
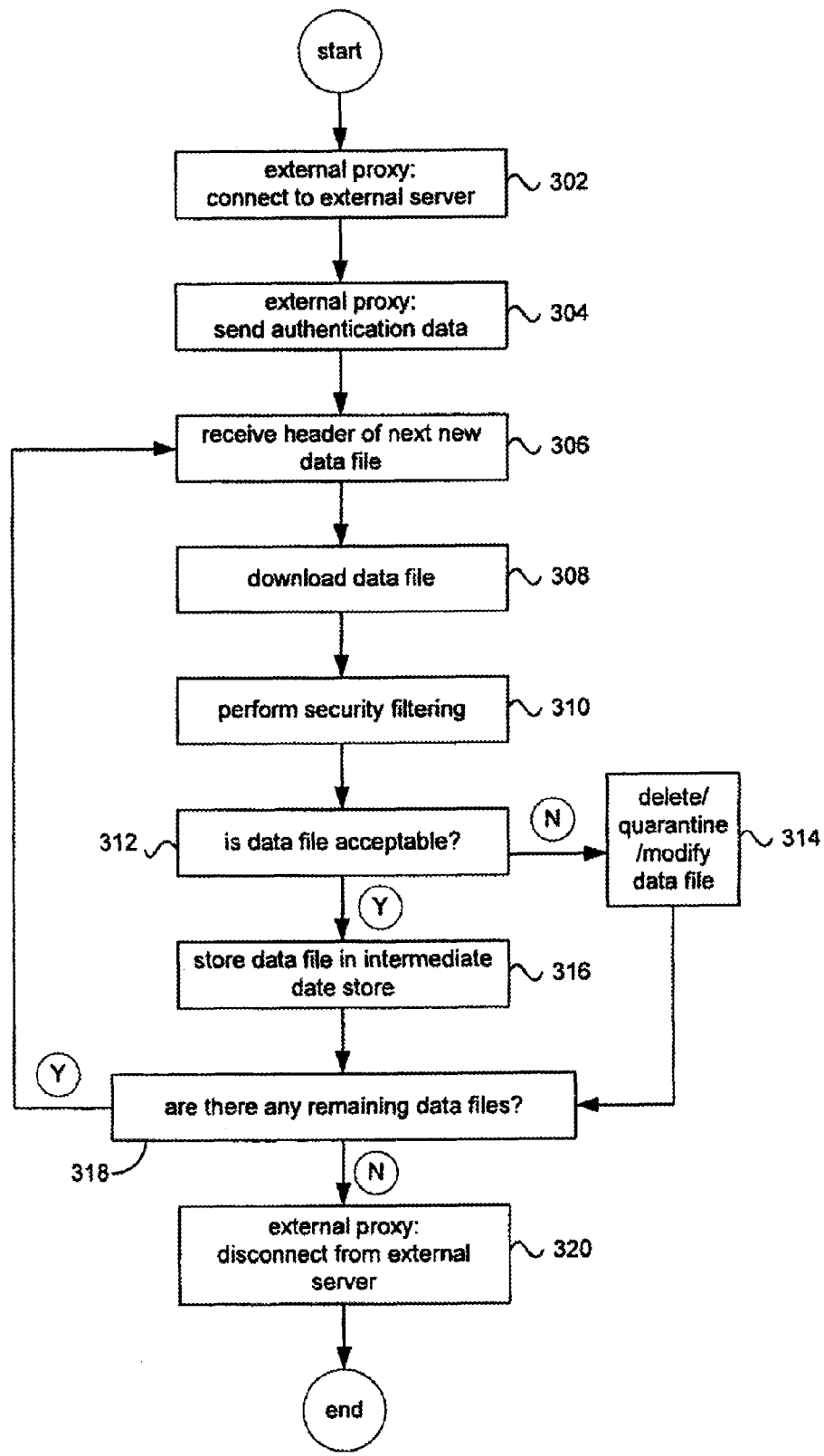
FIG. 3 is a flow chart of a data file downloading process performed by the proxy server.

The external proxy 204 downloads data from the external server 104 and deposits it in the intermediate data store 206 using a download process as shown in FIG. 3. The external proxy 204 commences, at step 302, by establishing a connection to the external server 104, via external network connector 202 and network 106. Once a connection is established, at step 304 the external proxy 204 sends profile data in the form of authentication data to the external server 104. The external server 104 then sends at least a portion of a data file to the external proxy 204; the portion of the data file sent is selected by the external server 104 based on information, including the profile data of one client 108, provided by the external proxy 204. At step 306 the external proxy 204 receives at least the header details of a data file. The external proxy 204 then commences downloading of the data file at step 308 and performs security filtering on the file at step 310; if the data file is not found to be acceptable by the security filtering (e.g. if the data file contains computer viruses or SPAM), as tested at step 312, the data file is quarantined, modified or deleted at step 314. If the data file is acceptable at step 312, it is stored in the intermediate data store 206 at step 316. At step 318, the external proxy checks to see if there are any remaining data files corresponding to the profile data of the client 108 still to be downloaded from external server 104. If further data files remain to be downloaded, the header of the next data file to be downloaded is received by the external proxy 204 at a repetition of step 306. If no remaining data files are to be downloaded, as tested at step 318, the external proxy 204 disconnects from the external server 104 at step 320.

At step 312, the external proxy 204 provides security-related filtering to quarantine, modify or remove data files that are unwanted, e.g. infected with computer viruses or likely to be SPAM files. Since the client 108 accesses only the intermediate data store 206, artifacts created by the security filtering are not visible to the client 108, thus there is no need for the substitution of 'place-holder' data files for unwanted data files when they are removed.

The external proxy 204 operates asynchronously from the internal proxy 208, preferably accessing the external server 104 and updating the intermediate data store 206 even when the client 108 is not present. The external proxy 204 may download and scan files periodically (e.g. hourly), or when other conditions arise (e.g. when traffic congestion on the network 106 is low). The download is performed based on timing data stored on the proxy server by the memory module that defines or provides a basis for the asynchronous download. The timing data can be client specific and stored as part of the client profile data.

Figure 4:
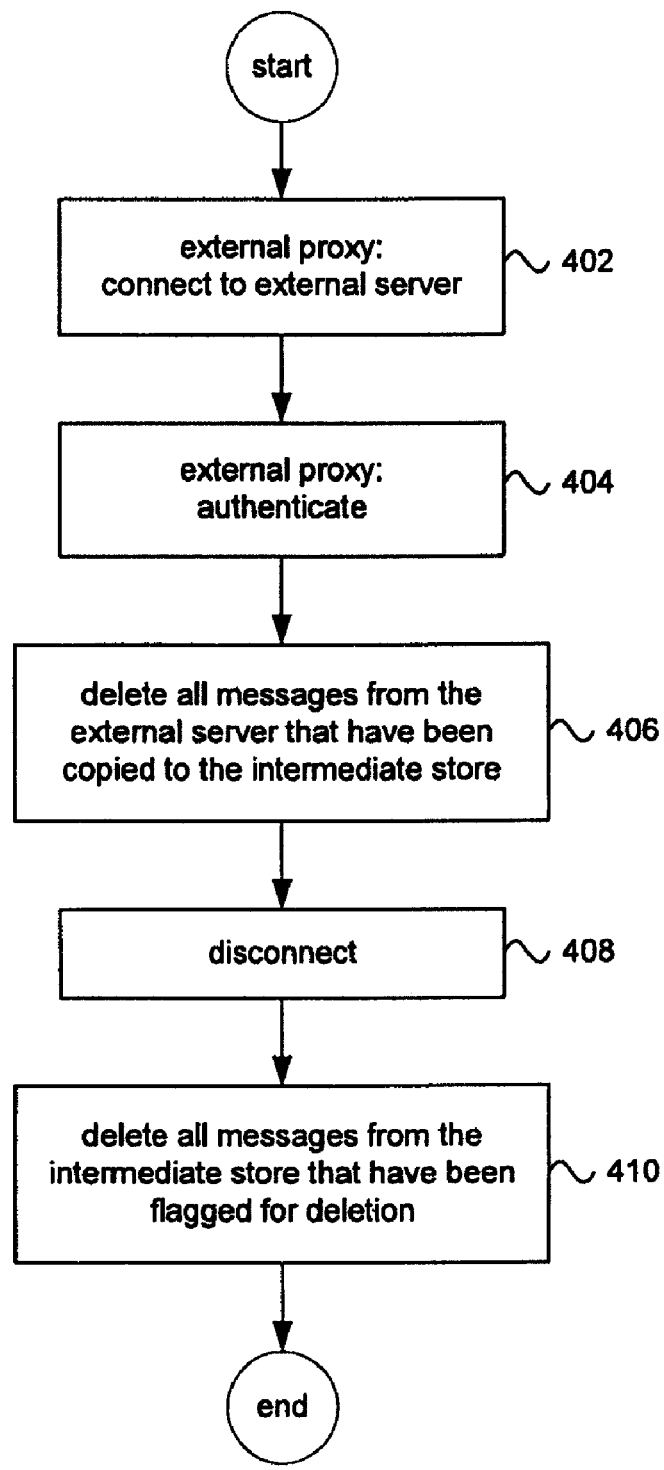
FIG. 4 is a flow chart of a data file deletion process performed by the proxy server.

The external proxy 204 deletes data files in the intermediate data store 206 that have been marked for deletion by the internal proxy 208, but only after the corresponding data files have been deleted from the external server 104. In a file deletion process, shown in FIG. 4, the external proxy 204 connects to external server 104 and accesses data files that correspond to profile data in a form of authentication data stored in proxy server 102 (steps 402 and 404). After authentication, the external proxy 204 requests, at step 406, deletion of all messages on the external server 104 that have been copied to the intermediate data store 206 in the file downloading process described above with reference to FIG. 3. The external proxy 204 subsequently disconnects from external server 104 at step 408. Finally, the external proxy 204 deletes all messages in the intermediate data store 206 that have been flagged for deletion by the internal proxy 208, due to communication with the client 108 (described further below), at step 410.

Figure 5:
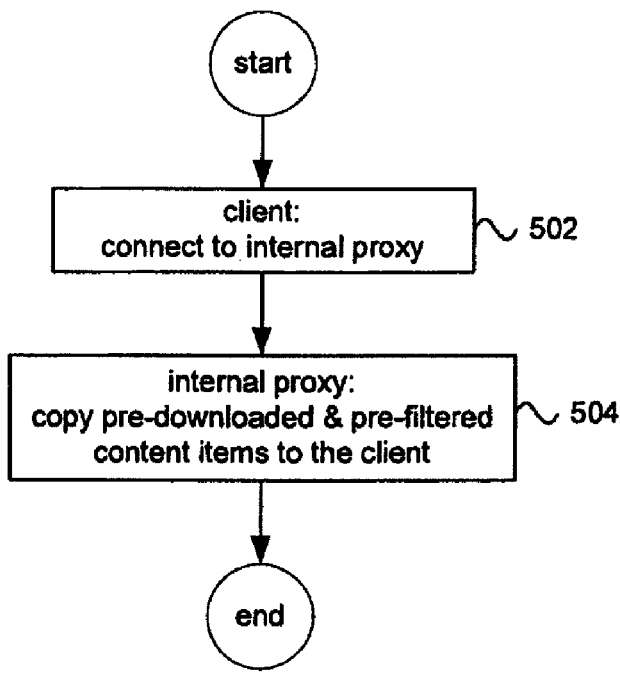
FIG. 5 is a flow chart of a data file transfer process between a client and the proxy server.

The internal proxy 208 performs a data file transfer process, as shown in FIG. 5, which commences when the client 108 connects to the internal proxy 208 at step 502. The client 108, at step 504, directs the internal proxy 208 to download one or more files from the intermediate data store 206 that have already been pre-downloaded, and pre-scanned, by the external proxy 204.

Figure 6:
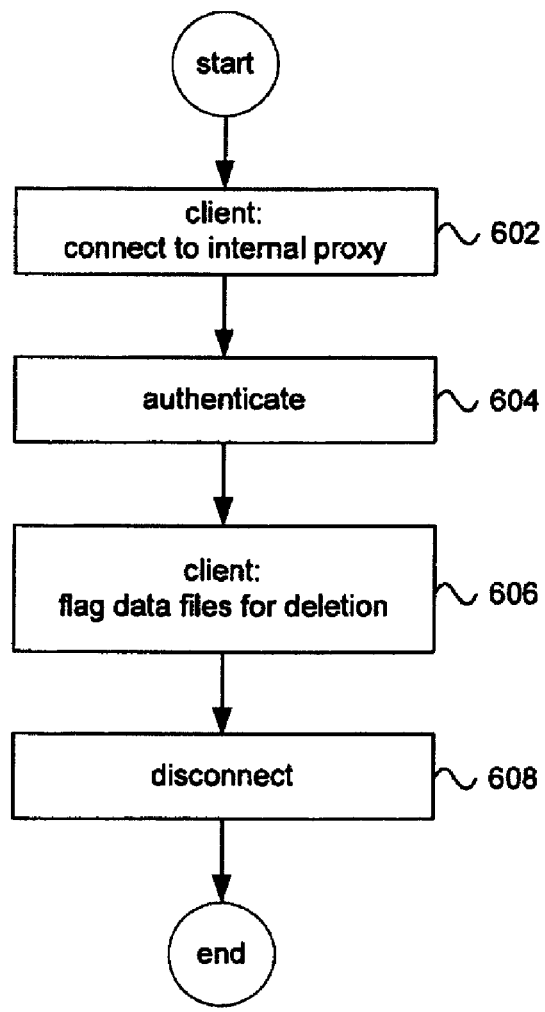
FIG. 6 is a flow chart of an authentication and deletion process between the client and the proxy server.

The internal proxy 208 also performs a file deletion as shown in FIG. 6. The client 108 connects to internal proxy 208 at step 602, and the client is authenticated against profile data stored in authentication data store 212 by internal proxy 208 at step 604. Once authenticated, the client may flag data files stored in the intermediate data store 206 for deletion at step 606, and disconnect at step 608. Once flagged for deletion, the data files in intermediate data store 206 remain to be deleted by the external proxy 204 using the data file deletion process described above with reference to FIG. 4.

Figure 7:
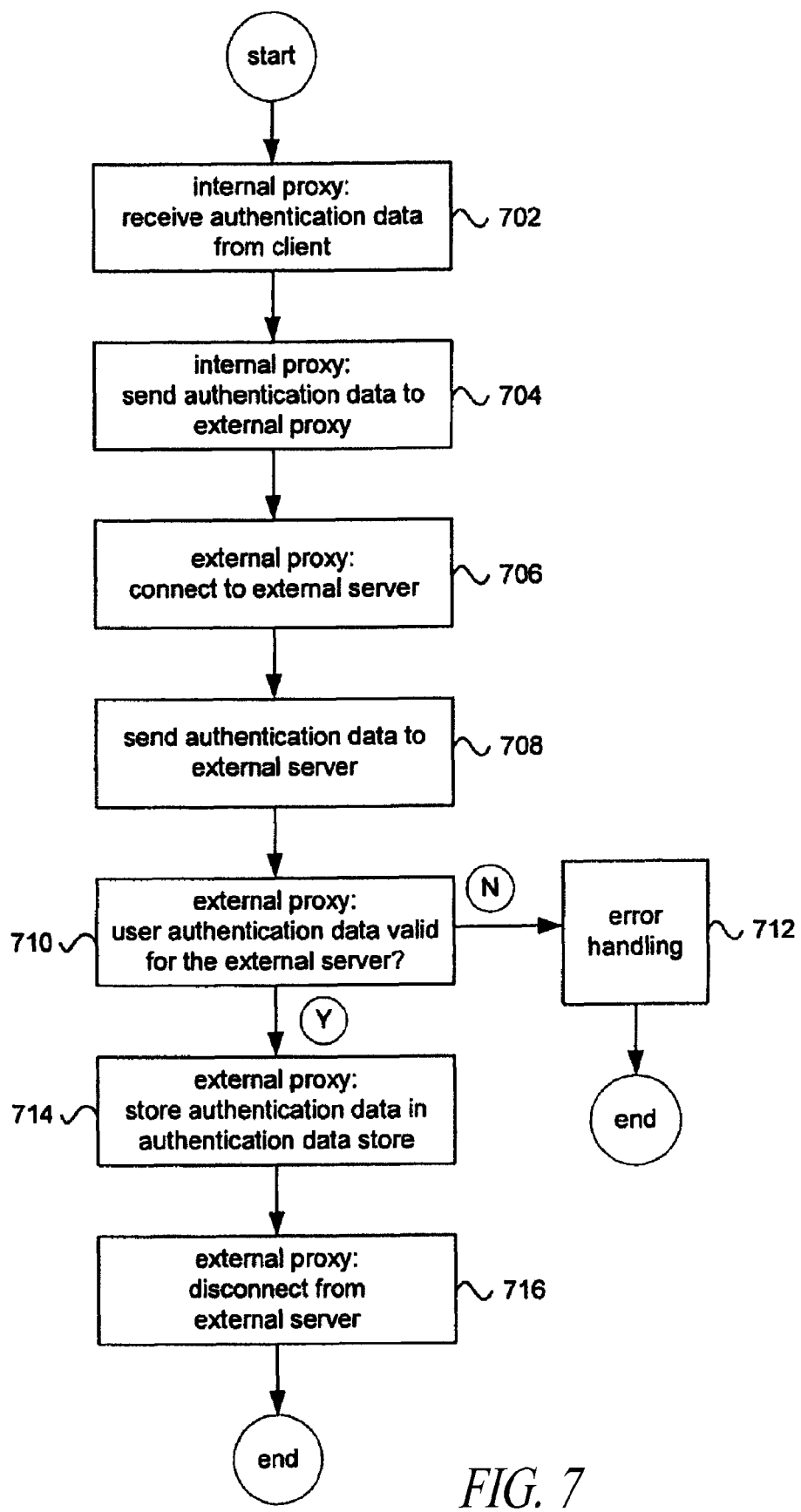
FIG. 7 is a flow chart of a process for receiving and validating profile data performed by the proxy server.

When a client 108 requests transfer of a data file, the proxy server 102 performs a process for validating the profile data as shown in FIG. 7. The client 108 presents profile data to the internal proxy 208 at step 702, including for example a username, password and/or an external server address. At step 702, the internal proxy 208 receives user profile data in the form of authentication data from the client 108. The internal proxy sends this user profile data to the external proxy 204 at step 704. To confirm that the user profile data is correct, the external proxy 204 then connects to external server 104 at step 706, sends the profile data at step 708 and tests whether the profile data is valid at step 710. If the profile data is not valid, the proxy server 102 performs an error handling procedure at step 712; which may result in the client 108 receiving a message that the intermediate data store 206 contains no new data files. If, on the on the other hand, the profile data is found to be valid, the external proxy 204 stores the profile data in the authentication data store 212 at step 714, and disconnects from external server 104 at step 716.

Figure 8:
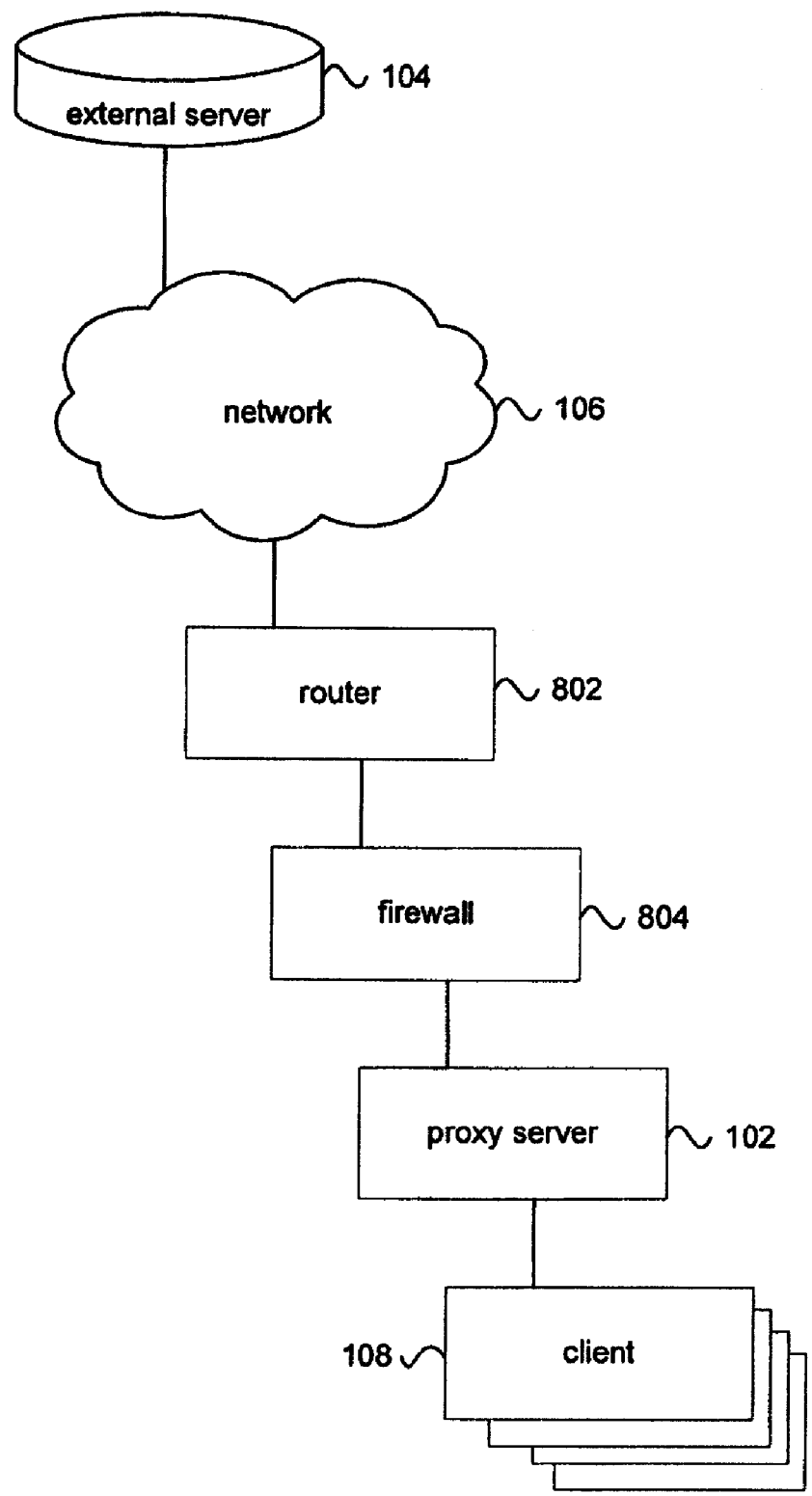
FIG. 8 is an arrangement of components including the proxy server, a router and a firewall.
Figure 9:
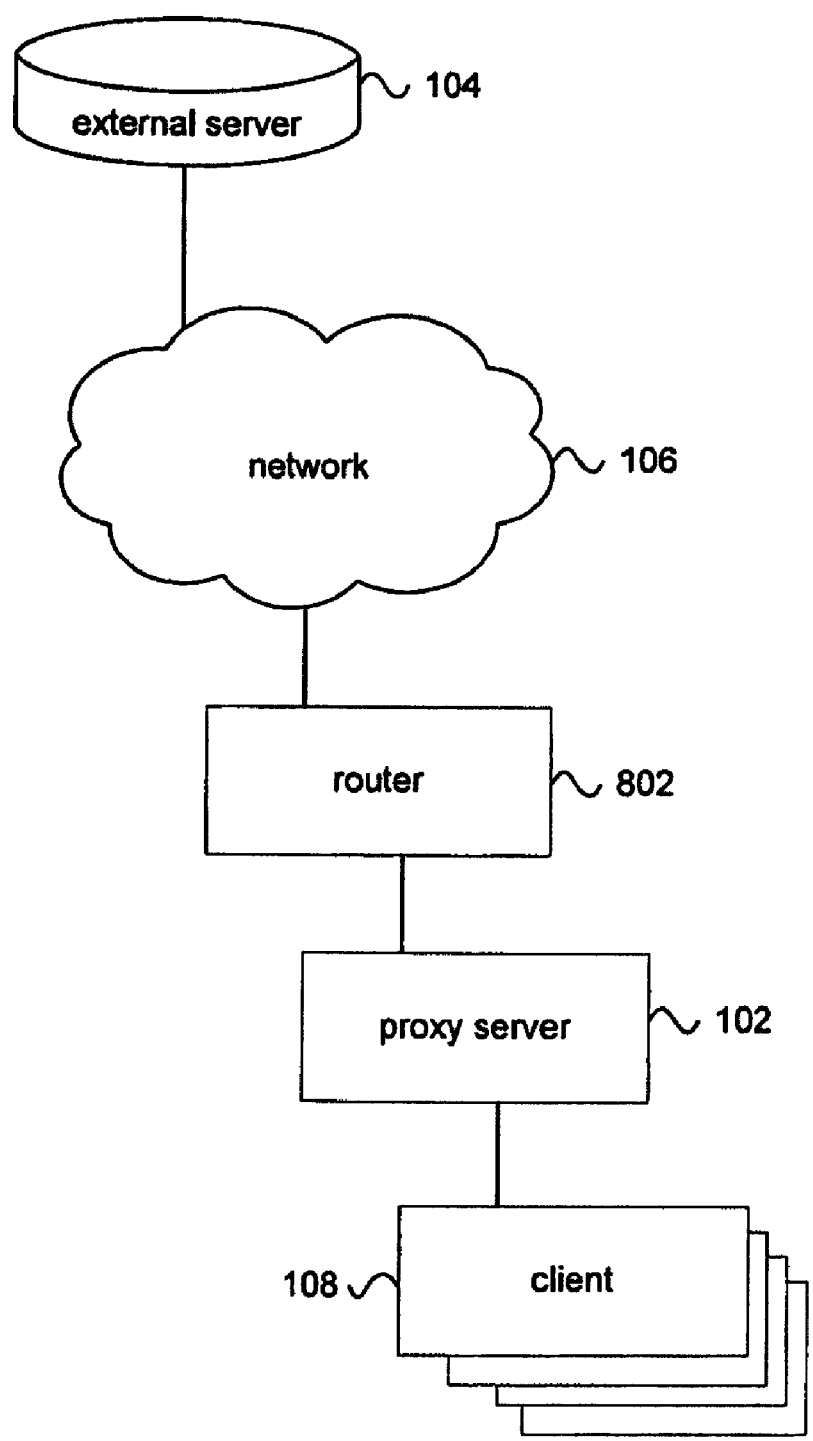
FIG. 9 is an arrangement of components including the proxy server and a router.
Figure 10:
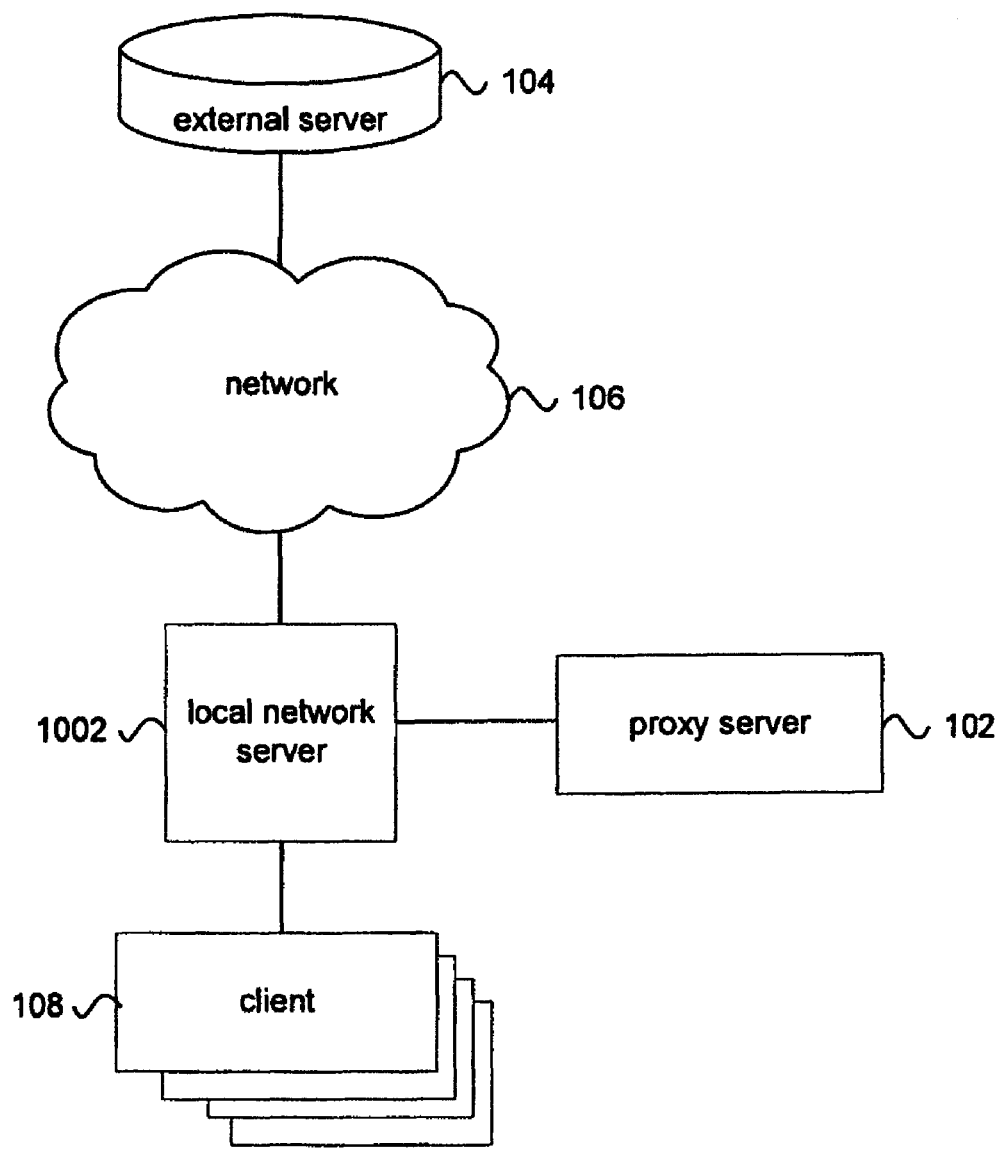
FIG. 10 is an arrangement of components showing the proxy server connected to a local network server.
Figure 11:
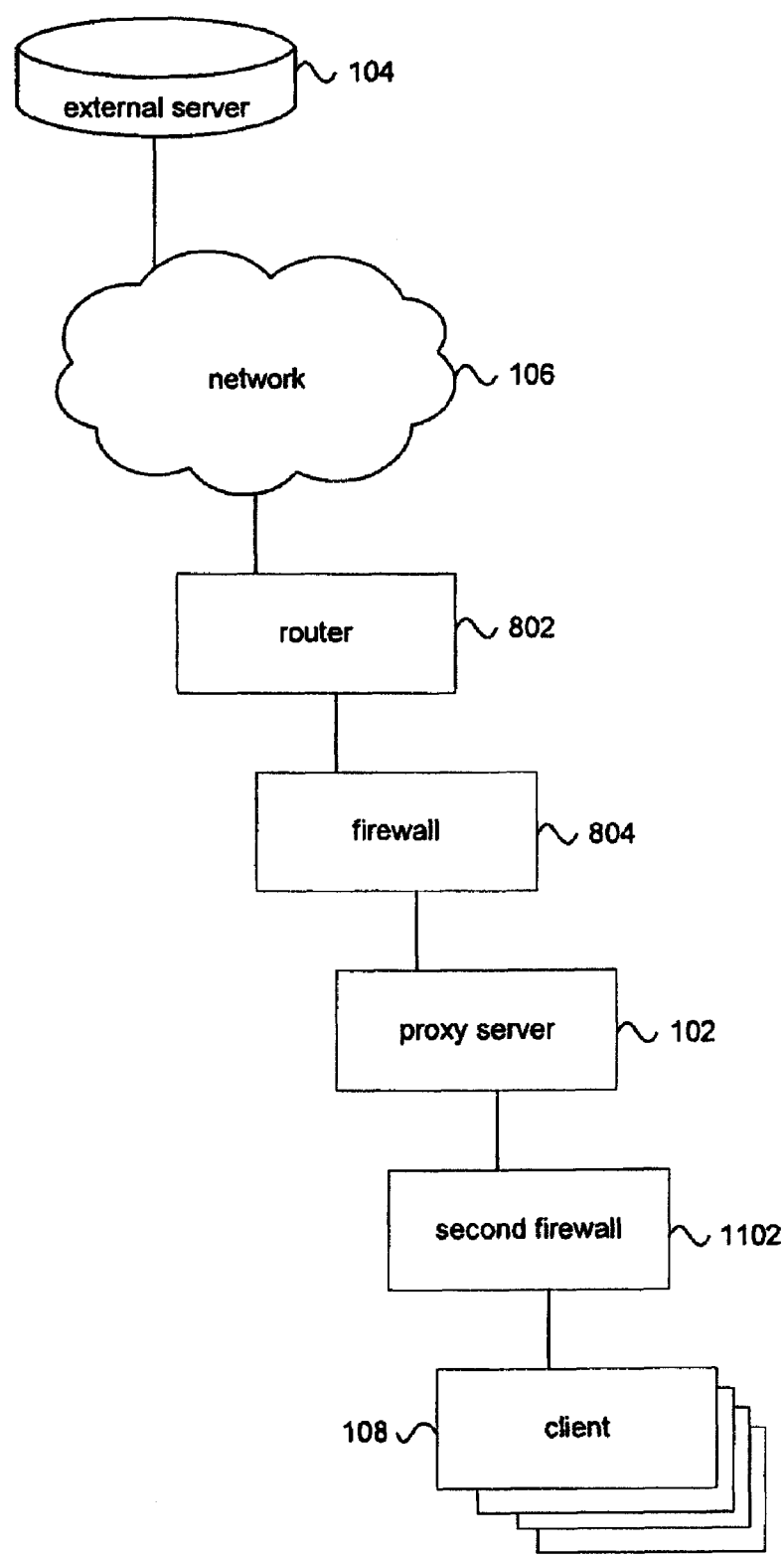
FIG. 11 is an arrangement of components showing the proxy server between two firewalls.

The local network including the proxy server 102 may be configured as shown in FIGS. 1, 8, 9, 10 and 11. FIG. 8 shows the proxy server 102 may be connected to network 106 through a router 802, and connected to one or more clients 108 through a network firewall 804. Alternatively, as shown in FIG. 9, the proxy server 102 may be connected directly to one or more clients 108 without the use of a firewall; or as shown in FIG. 11, the proxy server 102 may be between a first firewall 804 and a second firewall 1102. In a further alternative arrangement, shown in FIG. 10, the one or more clients 108 may be connected to the network 106 via a local network server 1002, and the proxy server 102 may communicate with the client 108 and the external server 104 through the local network server 1002. Other arrangements will also be apparent to those skilled in the art.

Figure 12:
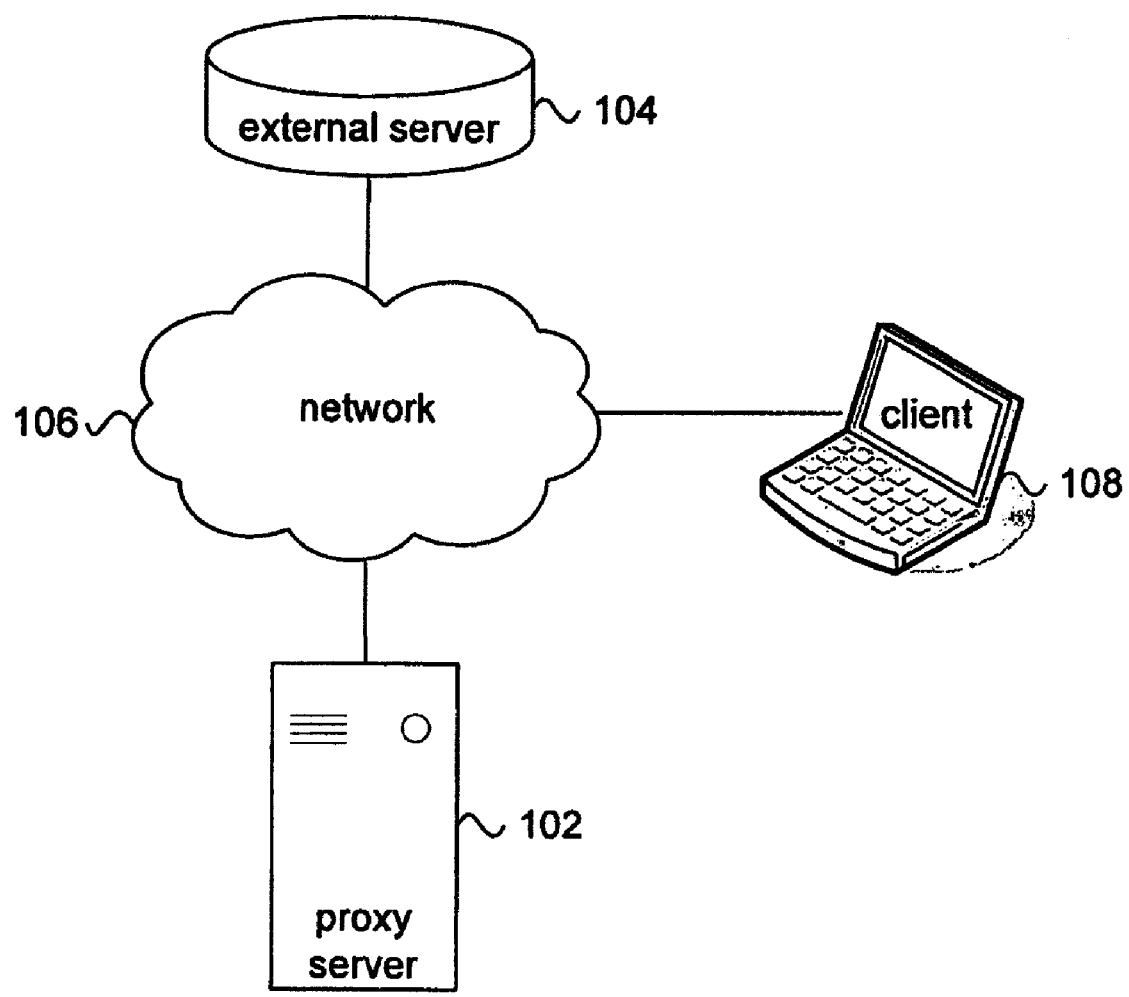
FIG. 12 is an arrangement of components showing a client connected to a network, not through the proxy server.

The client 108 may also access the external server 104 directly via the network 106, as shown in FIG. 12, e.g. by connecting a laptop computer through a private ISP in the user's home. In this case, the proxy server 102 is unaware of data files being downloaded from external server 104 to client 108, or of changes in the client profile data (e.g. the user's password).

If a client 108 changes its profile data on external server 104 between sessions with the internal proxy 102 (e.g. by accessing the external server 104 directly), the external proxy 204 will subsequently be unable to access the external server 104 as the profile data stored on the proxy server 102 will not change; the profile data on the proxy server 102 will only be updated when the client 108 next establishes a session with the internal proxy 208 and provides the new profile data. When the profile data is updated, any data files on the external server 104 corresponding to the updated profile data (e.g. belonging to a user's username/password combination) will be downloaded (to the intermediate data store 206) when the external proxy 204 performs the next scheduled access of the external server 104; advantageously, an access may be automatically performed when profile data stored on the proxy server 102 is updated.

The client 108 may also delete data files on the external server 104 when accessing it directly; for example, a client 108 may delete email messages from an external server 104 in the form of an email server. The external proxy 204 will discover that a data file has been deleted from the external server 104 when it performs the next downloading procedure (described above with reference to FIG. 3); if a data file has been deleted from the external server 104 but still remains in the intermediate data store 206, the external proxy 204 will delete the data file in the intermediate data store 206. The client 108 is not able to access the intermediate data store 206 until changed profile data (e.g. authentication data) has been verified by access to the external server 104; access to the external server 104 will then result in the identification of data files that have been deleted from the external server 104 and thus their deletion from the intermediate data store 206.

For accelerating POP3, the internal proxy 208, has a similar Transaction State to a normal POP3 server, but has different processing for the Authorization State and the Update State, described in RFC 1939 and in the Appendix.

In the Authorization State, the internal proxy 208 tests profile data, in the form of client-provided authentication tokens, against the external server 104, and—if correct—stores them for later use in the authentication data store 212, before the proxy 102 disconnects from the external server 104 and the internal proxy 208 resumes normal operation as a POP3 server (i.e. serving data from the intermediate data store 206).

The internal proxy 208 simply does not implement parts of the Update State processing of a POP3 server: although it marks messages for deletion, it never actually carries out this deletion. Deletion is carried out by the external proxy 204.

The address of the external server 104 may be fixed as far as the network 106 is concerned, but in a number of instances, the network address, particularly the IP address may change, for example if the external server is part of a farm of servers of an Internet service provider. In order to properly identify the external server 104, the proxy server 102 may perform an identification or classification process as described in the patent specification of the International (PCT) patent application entitled "A System for Classifying an Internet Protocol Address" filed by the Applicant on the same day as this application (and which is herein incorporated by reference).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

APPENDIX: POP3 PROTOCOL DETAILS

The following is a simplified explanation of the POP3 protocol.

The POP3 protocol supports a number of commands and a number of states.

The server host starts the POP3 service by listening on TCP port 110. When a client wishes to open a session, it communicates with the server on TCP port 110. When the connection is established, the POP3 server sends a greeting. The client and POP3 server then exchange commands and responses (respectively) until the connection is closed or aborted.

Commands in POP3 include the following case-insensitive keywords, followed in some cases by one or more arguments:

| COMMANDS and arguments | | States in which valid | | |
|---|---|---|---|---|
| Required | Optional | Authorization | Transaction | Update |
| USER name | | ✓ | | |
| PASS string | | ✓ | | |
| QUIT | | ✓ | ✓ | ✓ |
| STAT | | | ✓ | |
| LIST [msg] | | | ✓ | |
| RETR msg | | | ✓ | |
| DELE msg | | | ✓ | |
| NOOP | | | ✓ | |
| RSET | | | ✓ | |
| | APOP name digest | ✓ | | |
| | TOP msg n | | ✓ | |
| | UIDL [msg] | | ✓ | |

In each case the server replies with a status indicator and a keyword, possibly followed by additional information. The possible status indicators are "+OK" or "−ERR", which must be sent in upper case. With the exception of the STAT, LIST, and UIDL commands, any text following "+OK" or "−ERR" may be ignored by the client.

Responses to certain commands are multi-line. In these cases, after the first line of the response, any additional lines are sent, followed by a single terminating period (".") alone on a line.

As can be seen from the above table, a POP3 session may be in a number of states during its lifetime. It begins in the AUTHORIZATION state. The client identifies itself to the POP3 server. Once the client has successfully done this, the server attempts to acquire resources associated with the client's mailbox (typically to lock it), and if this is successful, the session enters the TRANSACTION state.

In this state, the client requests actions on the part of the POP3 server. When the client has issued the QUIT command, the session enters the UPDATE state. In this state, the POP3 server releases any resources acquired during the TRANSACTION state and says goodbye. The connection is then closed.

The AUTHORIZATION State

When the TCP connection is initially opened by a POP3 client, the server issues a one line greeting. This can be any positive response. An example might be a banner greeting such as:

+OK POP3 server on jeeves is ready.

The POP3 session is now in the AUTHORIZATION state. The client must now identify and authenticate itself to the POP3 server. There are two possible mechanisms for doing this:

The USER and PASS commands.

| Source | Command/Response | Comments |
|---|---|---|
| Client | USER charles | Client provides username |
| Server | +OK | Minimal positive response |
| Client | PASS windsor | Client provides password |
| Server | +OK | Minimal positive response |

Other possible negative replies:

| Source | Command/Response | Comments |
|---|---|---|
| Client | USER charles | Client provides username |
| Server | −ERR | Minimal negative response |
| | −ERR no such mailbox | Detailed negative response |
| | −ERR failed to lock mailbox | |
| Client | PASS windsor | Client provides password |
| Server | −ERR mailbox already locked | Detailed negative response |

The APOP command.

The APOP command is an optional command: it is not required of POP3 servers and is not supported by the present invention.

If authorization is successfully completed, and the mailbox is locked, the POP3 session enters the TRANSACTION state. If authorization or mailbox locking fails, the server responds with a negative status indicator, and at that point either the server or the client may close the connection. If the server does not do so, the client may choose to attempt authentication again.

When the server opens the mailbox, it assigns a message-number (starting with 1) to each message, and notes the size of each message in octets. These message numbers are later used by the client. Note also that at this point no messages are marked as deleted.

The TRANSACTION State

Once in the TRANSACTION state, the client may issue any of the commands that are valid for that state, repeatedly. After each command, the server issues a response. Eventually, the client issues the QUIT command and the POP3 session enters the UPDATE state.

Each of the commands that is valid in the TRANSACTION state is discussed in turn.

The STAT command.

The POP3 server issues a positive response consisting of "+OK" followed by a single space, the total number of messages in the mailbox, a single space, and the total size of the mailbox in octets. Messages marked as deleted are not counted in either total.

| Source | Command/Response | Comments |
|---|---|---|
| Client | STAT | |
| Server | +OK 3 648 | There are 3 messages totaling 648 octets. |

The LIST command.

The client sends the LIST command with or without a message number. If given, the message number must refer to an undeleted message.

If no message number is given, the server response with a line for each undeleted message in the mailbox.

| Source | Command/Response | Comments |
|---|---|---|
| Client | LIST | |
| Server | +OK | There are 3 messages. |
| | 1 124 | Message 1 is 124 octets in size. |
| | 2 327 | Message 2 is 327 octets in size. |
| | 3 197 | Message 3 is 197 octets in size. |
| | . | |

If a message number is given, the server responds with the details for that message or with a negative response if that message is invalid.

| Source | Command/Response | Comments |
|---|---|---|
| Client | LIST 2 | |
| Server | +OK 2 327 | Message 2 is 327 octets in size. |
| Client | LIST 4 | |
| Server | −ERR no such message | There are only three messages in the mailbox. |

The RETR command.

The client sends the RETR command followed by a message number, which must identify a non-deleted message. The POP3 server either issues a negative response or a positive response consisting of "+OK" followed by a multi-line response containing the text of the email message referred to by the message number.

| Source | Command/Response |
|---|---|
| Client | RETR 2 |
| Server | +OK |
| | <message text, usually over multiple lines> |
| | . |

| Source | Command/Response | Comments |
|---|---|---|
| Client | RETR 2 | |
| Server | −ERR message deleted | Message 2 has been marked as deleted. |
| Client | RETR 4 | |
| Server | −ERR no such message | There are only three messages in the mailbox. |

The DELE command.

The client sends the DELE command followed by a message number, which must identify a non-deleted message. The POP3 server either issues a negative response or marks the message as deleted, and issues a positive response consisting of "+OK". Note that the POP3 server does not actually delete the message until the POP3 session enters the UPDATE state.

| Source | Command/Response |
|---|---|
| Client | DELE 2 |
| Server | +OK |

| Source | Command/Response | Comments |
|---|---|---|
| Client | RETR 2 | |
| Server | −ERR message deleted | Message 2 has already been deleted. |
| Client | RETR 4 | |
| Server | −ERR no such message | There are only three messages in the mailbox. |

The NOOP command.

The client sends the NOOP command without arguments; the server replies with a positive response.

| Source | Command/Response | Comments |
|---|---|---|
| Client | NOOP | |
| Server | +OK | |

The RSET command.

The client sends the RSET command without arguments. The server, which must identify a non-deleted message. The POP3 server either issues a negative response or a positive response consisting of "+OK" followed by a single space, the total number of messages in the mailbox, a single space, and the total size of the mailbox in octets. Messages marked as deleted are not counted in either total.

| Source | Command/Response | Comments |
|---|---|---|
| Client | RSET | |
| Server | +OK | Any messages marked as deleted have been un-marked. |

The UPDATE State

When (and only when) the client issues the QUIT command from the TRANSACTION state, the POP3 session enters the UPDATE state.

The POP3 server removes all messages marked as deleted from the mailbox and replies as to the status of this operation. If there is an error, such as a resource shortage, encountered while removing messages, this may result in the mailbox having some or all of the messages marked as deleted not removed. The server must never remove any messages not marked as deleted.

Whether the removal was successful or not, the server then releases any exclusive-access lock on the mailbox and closes the TCP connection.

| Source | Command/Response | Comments |
|---|---|---|
| Client | QUIT | |
| Server | +OK | Any messages marked as deleted have been removed. |
| Client | QUIT | |
| Server | −ERR | There was a problem (usually resource-related). |

Optional POP3 Commands

There are three optional POP3 commands.

The TOP command

The client sends the TOP command with two arguments: a message number and n, a number of lines. The server replies with a negative response or with a positive response and the first n lines of the message. If there are fewer than n lines in the message this is not an error, and the entire message is sent.

| Source | Command/Response | Comments |
|---|---|---|
| Client | TOP 2 2 | Request for the first 2 lines of message number 2. |
| Server | +OK<br><first ten lines><br><of message 2><br>. | |
| Client | TOP 3 35 | Request for the first 35 lines of message number 3. |
| Server | −ERR message deleted | Message 3 has been marked as deleted. |

The UIDL command

The client sends the UIDL command with an optional argument: a message number that must not refer to a deleted message. The server replies with a negative response in the case of an error.

Otherwise, if an argument is given, the server responds with a unique ID string for the corresponding message. If an argument is not given, the server responds with a multi-line response including a line for each message that has not been marked as deleted, each line containing the message number and the unique ID string for the message.

| Source | Command/Response | Comments |
|---|---|---|
| Client | UIDL 2 | Request for unique ID for message number 2. |
| Server | +OK 2 lsdfljlksdks82 | |
| Client | UIDL | Request for unique IDs for all messages. |
| Server | +OK<br>1 kljdkgjaivir56<br>2 lsdfljlksdks82.<br>. | |
| Client | UIDL 4 | |
| Server | −ERR no such message | There are only three messages in the mailbox. |

The unique-id of a message is an arbitrary server-determined string, consisting of one to 70 characters in the range 0x21 to 0x7E, which uniquely identifies a message within a mailbox and which persists across sessions. This persistence is required even if a session ends without entering the UPDATE state. The server should never reuse an unique-id in a given mailbox, for as long as the entity using the unique-id exists.

The APOP command (addressed previously).

Example POP3 Session

| SERVER | <waiting for connection on TCP port 110> |
|---|---|
| CLIENT | <open connection> |
| SERVER | +OK <21709.712039258@svr12.pop3.mailsp.com> |
| CLIENT | USER charles |
| SERVER | +OK |
| CLIENT | PASS windsor |
| SERVER | +OK |
| CLIENT | STAT |
| SERVER | +OK 3 648 |
| CLIENT | LIST |
| SERVER | +OK 3 messages (648 octets)<br>1 124<br>2 327<br>3 197<br>. |
| CLIENT | RETR 1 |
| SERVER | +OK 124 octets<br><server sends message 1><br><usually over more than one line><br><terminated by a single period><br>. |
| CLIENT | DELE 1 |
| SERVER | +OK message 1 deleted |
| CLIENT | DELE 2 |
| SERVER | +OK message 2 deleted |
| CLIENT | QUIT |
| SERVER | +OK POP3 server signing off (2 messages remaining) |
| CLIENT | <close connection> |
| SERVER | <wait for next connection> |

The invention claimed is:

1. A proxy server, comprising
at least one computer server including:
a download module including a first proxy configured to download a data file for a client from an external server over a network using profile data that includes authentication data associated with said client and stored on the proxy server, the external server and client being external to the proxy server;
a memory module including a data store which stores said profile data and said data file; and
a transfer module including a second proxy configured to retrieve the data file from the memory module and transfer the data file to said client when requested by said client, wherein the first proxy of the download module is configured to, asynchronously to and independently of the transfer module, connect to the external server over the network, authenticate on behalf of said client, and download the data file for the client prior to the client requesting the data file.

2. A proxy server as claimed in claim 1, wherein a connection between the proxy server and the client has a higher data rate than a connection between the proxy server and the external server.

3. A proxy server as claimed in claim 1, wherein the download module is configured to scan the data file to detect unauthorized content in the data file.

4. A proxy server as claimed in claim 3, wherein the download module is configured to, in response to detecting unauthorized content in the data file, delete or quarantine the file, or remove the unauthorized content from the data file.

5. A proxy server as claimed in claim 3, wherein said unauthorized content includes computer viruses and spam messages.

6. A proxy server as claimed claim 1, wherein the data file is an email, an RSS feed document, or a web page.

7. A proxy server as claimed in claim 1, wherein the wherein the second proxy is configured to obtain the profile data from the client, and validate the profile data by communication with the external server.

8. A proxy server as claimed in claim 7, wherein the profile data includes an Internet protocol address associated with said client.

9. A proxy server as claimed in claim 1, wherein said authentication data includes a username and a password of a user of the client.

10. A proxy server as claimed in claim 8, wherein said client comprises a mail user agent and the second proxy is configured to obtain the profile data using the Post Office Protocol (POP).

11. A proxy server as claimed in claim 1, wherein the proxy server communicates with the external server and with the client using the Post Office Protocol (POP).

12. A proxy server as claimed in claim 1, wherein said memory module includes an intermediate data store for said data file and an authentication data store for said profile data.

13. A proxy server as claimed in claim 12, wherein the second proxy uses Post Office Protocol (POP) commands in an authorization state to validate authentication data and stores the validated data in the authentication data store.

14. A proxy server as claimed in claim 13, wherein the first proxy uses POP commands to obtain data files from the external server and stores said data files in the intermediate data store, and the second proxy uses POP commands in an update state to mark data files in said intermediate data store for deletion by the first proxy.

15. A proxy server as claimed in claim 1, wherein the proxy server operates transparently with respect to the client.

16. A proxy process executed by at least one computer server, including:
   storing, in a memory of the at least one computer server, profile data including authentication data associated with a client that is external to the at least one computer server;
   downloading a data file for the client from an external server over a network, after authenticating with the external server on behalf of the client using the stored profile data and before the client requests the data file, the external server being external to the at least one computer server;
   storing said data file in the memory; and
   subsequently retrieving the data file from the memory and transferring the data file to said client when requested by said client, wherein said downloading and authenticating are performed asynchronously to and independently of said retrieving and transferring.

17. A proxy process as claimed in claim 16, wherein a transfer connection to the client has a higher data rate than a download connection to the external server.

18. A proxy process as claimed in claim 16, including scanning the data file to detect unauthorized content in the data file.

19. A proxy process as claimed in claim 18, wherein when unauthorized content is detected in the data file, the file is deleted, quarantined, or the unauthorized content is removed from the data file.

20. A proxy process as claimed in claim 18, wherein said unauthorized content includes computer viruses and spam messages.

21. A proxy process as claimed in claim 16, wherein the data file is an email, an RSS feed document, or a web page.

22. A proxy process as claimed in claim 16, including obtaining the profile data from the client, and validating the profile data by communication with the external server.

23. A proxy process as claimed in claim 22, wherein the profile data includes an Internet protocol address associated with said client.

24. A proxy process as claimed in claim 23, wherein said authentication data includes a username and a password of a user of the client.

25. A proxy process as claimed in claim 23, wherein said client comprises a mail user agent and the profile data is obtained using the Post Office Protocol (POP).

26. A proxy process as claimed in claim 16, including communicating with the external server and with the client using the Post Office Protocol (POP).

27. A proxy process as claimed in claim 16, including storing said data file in an intermediate data store of the memory and storing said client profile data in an authentication data store of the memory.

28. A proxy process as claimed in claim 27, including validating authentication data using Post Office Protocol (POP) commands in an authorization state and storing the validated data in the authentication data store.

29. A proxy process as claimed in claim 28, including obtaining data files from the external server uses POP commands and storing said data files in the intermediate data store, and marking data files in said intermediate data store for deletion using POP commands in an update state.

30. A proxy process as claimed in claim 16, wherein said process operates transparently with respect to the client.

31. A non-transitory computer-readable medium including contents that cause at least one computer server to implement a process comprising: storing in a memory of the at least one computer server, profile data including authentication data associated with a client that is external to the at least one computer server;
   downloading a data file for the client from an external server over a network, after authenticating with the external server on behalf of the client using the stored profile data and before the client requests the data file, the external server being external to the at least one computer server;
   storing said data file in the memory; and
   subsequently retrieving the data file from the memory and transferring the data file to said client when requested by said client, wherein said downloading and authenticating are performed asynchronously to and independently of said retrieving and transferring.

32. The non-transitory computer-readable medium as claimed in claim 31, wherein the process includes obtaining the profile data from the client, and validating the profile data by communication with the external server.

33. The non-transitory computer-readable medium as claimed in claim 32, wherein the profile data includes an Internet protocol address associated with said client.

34. The non-transitory computer-readable medium as claimed in claim 33, wherein said client comprises a mail user agent and the profile data is obtained using the Post Office Protocol (POP).

35. The non-transitory computer-readable medium as claimed in claim 31, wherein the process includes communicating with the external server and with the client using the Post Office Protocol (POP).

36. The non-transitory computer-readable medium as claimed in claim 31, wherein the process includes storing said data file in an intermediate data store of the memory and storing said client profile data in an authentication data store of the memory.

37. The non-transitory computer-readable medium as claimed in claim 36, wherein the process includes validating authentication data using Post Office Protocol (POP) commands in an authorization state and storing the validated data in the authentication data store.

38. The non-transitory computer-readable medium as claimed in claim 37, wherein the process includes obtaining data files from the external server uses POP commands and storing said data files in the intermediate data store, and marking data files in said intermediate data store for deletion using POP commands in an update state.

* * * * *